July 6, 1954

S. G. BLUMENSAADT 2,682,659

CLIP FORMING AND CLINCHING DIE FIXTURE

Filed Sept. 28, 1949

INVENTOR.
SVEND G. BLUMENSAADT
BY
ATT.

July 6, 1954  S. G. BLUMENSAADT  2,682,659
CLIP FORMING AND CLINCHING DIE FIXTURE
Filed Sept. 28, 1949  7 Sheets-Sheet 2

INVENTOR.
SVEND G. BLUMENSAADT
BY
Gustav A. Wolff
ATT.

July 6, 1954  S. G. BLUMENSAADT  2,682,659
CLIP FORMING AND CLINCHING DIE FIXTURE
Filed Sept. 28, 1949  7 Sheets-Sheet 5

INVENTOR.
SVEND G. BLUMENSAADT
BY
Gustav A. Wolff
ATT.

July 6, 1954     S. G. BLUMENSAADT     2,682,659
CLIP FORMING AND CLINCHING DIE FIXTURE
Filed Sept. 28, 1949     7 Sheets-Sheet 7

INVENTOR.
SVEND G. BLUMENSAADT
BY
*Gustav A. Wolff*
ATT.

Patented July 6, 1954

2,682,659

UNITED STATES PATENT OFFICE 2,682,659

CLIP FORMING AND CLINCHING DIE FIXTURE

Svend G. Blumensaadt, Beachwood Village, Ohio, assignor to The Universal Wire Spring Company, Cleveland, Ohio, a corporation of Ohio Application September 28, 1949, Serial No. 118,355

3 Claims. (Cl. 1—175)

This invention relates in general to die fixtures and more particularly to clip-forming and clinching die fixtures adapted to successively form clips and clinch same around members to be connected.

The primary object of the present invention is the provision of a clip-forming and clinching die fixture embodying a stationary die-shoe-supporting member and a shiftable die-punch-supporting member, the latter including an axially-rotatable die plate mounting a plurality of die punches cooperating with the stationary die member in successively shaping sheet metal blanks to clips, and effecting clinching of these clips around wire members to be assembled to wire structures.

Another object of the invention is the provision of a clip-forming and clinching die fixture embodying a stationary die-shoe-supporting member having a forming die shoe and a clinching die shoe, and a vertically shiftable, die-punch-supporting member including an axially-rotatable die plate mounting a plurality of die punches constructed to successively effect, in cooperation with the forming and clinching die shoes, forming of sheet metal blanks to U-shaped sheet metal clips, transferring of such sheet metal clips to the clinching shoe member, and finally clinching of the clips around wire members to be asembled to a wire structure.

The above and additional objects and novel features of construction, combination and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1a is a fragmentary sectional view on line 1a—1a of Fig. 4;

Figure 1:
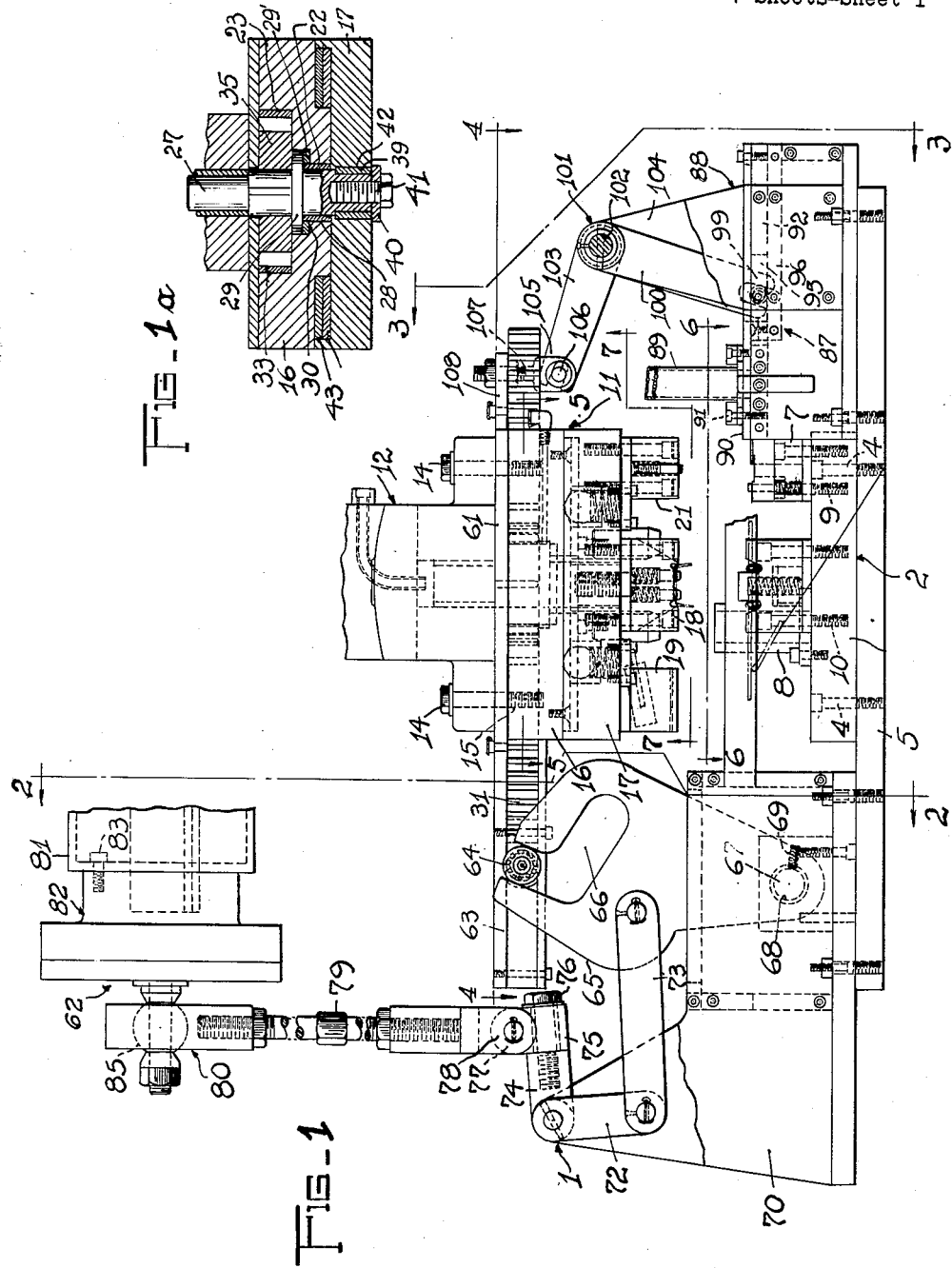
Fig. 1 is a side view of the die fixture embodying the invention, the fixture showing the forming and clinching shoes attached to the bed plate of a punch press and the shiftable die punch supporting member attached to the ram of such punch press.
Figure 6:
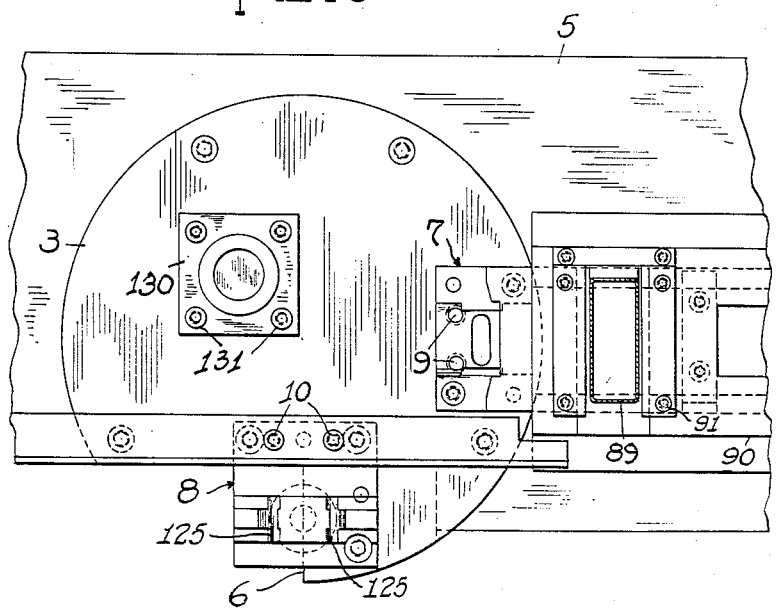
Fig. 6 is a horizontal sectional view on line 6—6 of Fig. 1.
Figure 7:
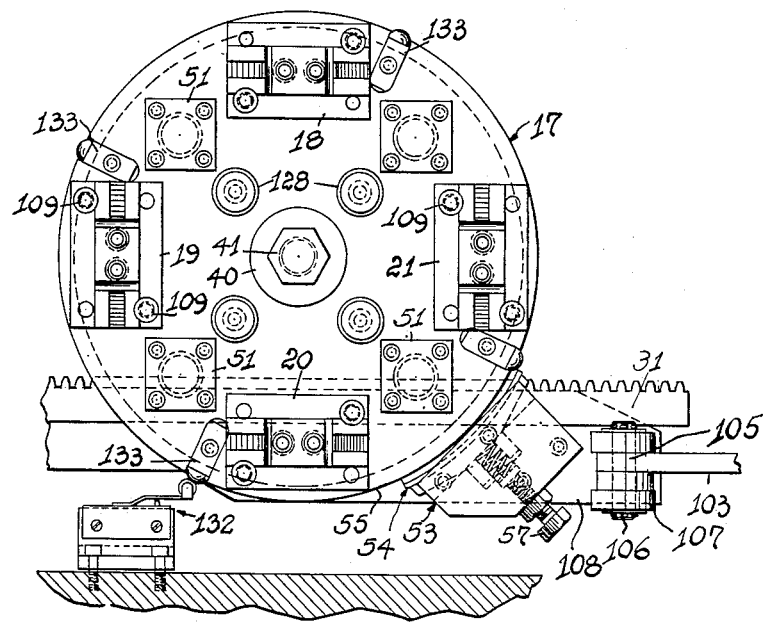
Fig. 7 is a bottom view of the shiftable die-punch-supporting member, the view being taken on line 7—7 of Fig. 1.

Referring now more in detail to the exemplified form of the invention shown in the drawings, reference numeral 2 denotes a stationary die-shoe-supporting member having its base plate 3, by means of socket head screws 4, attached to the bed plate 5 of a punch press of common construction (not shown). Base plate 3 (see Fig. 6) is of substantially circular outline with a cut-out portion 6 and supports a clip-forming die shoe 7 and a clinching die shoe 8, the die shoes being attached to base plate 3 by socket head screws 9 and 10, respectively. The shoe-supporting die member 2 cooperates with a vertically-shiftable, die-punch-supporting member 11 (see Fig. 1) secured to the ram 12 of the punch press by head screws 14 threadedly engaged with bores 15 in the base plate 16 of shiftable die-punch supporting member 11. This latter member (see Fig. 7) embodies a horizontally rotatable disk 17 which mounts four identically-constructed punches 18, 19, 20 and 21 arranged and constructed to successively cooperate with die shoes 7 and 8 on base plate 3 when disk 17 is rotated step by step for successively forming metal clips from sheet metal blanks and clinching the clips about wire members manually or automatically fed to clinching die shoe 8 and to be assembled to a wire structure.

Figure 5:
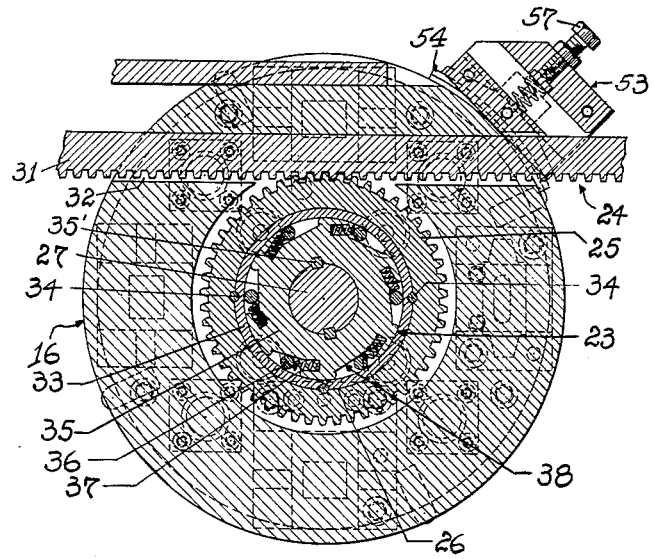
Fig. 5 is a horizontal sectional view on line 5—5 of Fig. 1.

The base plate 16 of die punch supporting member 11 (see Figs. 1a and 5) has circular outline and includes an axial recessed bore 22 encircled at the top of the base plate by a large, recessed portion to form a working chamber 23 for a rack and pinion drive arrangement 24. The pinion 25 of this arrangement is coupled by a ratchet drive 26 with a shaft 27 rotatably mounted in a bearing 28 which is extended into the lower portion of bore 22. The shaft 27 is formed with a circular flange 29 seated on a washer 29' resting on the circular shoulder 30 in recessed bore 22 and is thus rotatably suspended from base plate 16. The rack and pinion drive arrangement 24 with pinion 25 and rack bar 31, slidably arranged in a slot 32 intersecting chamber 23, has the pinion 25 releasably coupled with shaft 27 by ratchet drive 26. This ratchet drive embodies an outer ring 33 keyed to pinion 25 by keys 34, a ratchet-like wheel 35 and spring-pressed steel balls 36 which couple wheel 35 with the outer ring 33 when shifted by springs 37 on sloping planes 38 of wheel 35 into engagement with the inner wall of outer ring 33. The wheel 35, keyed to shaft 27 by keys 35' is rotated by the ratchet drive 26 in left handed direction by a left handed rotation of pinion 25 when such wheel by balls 36 is coupled with ring 33.

Figure 8:
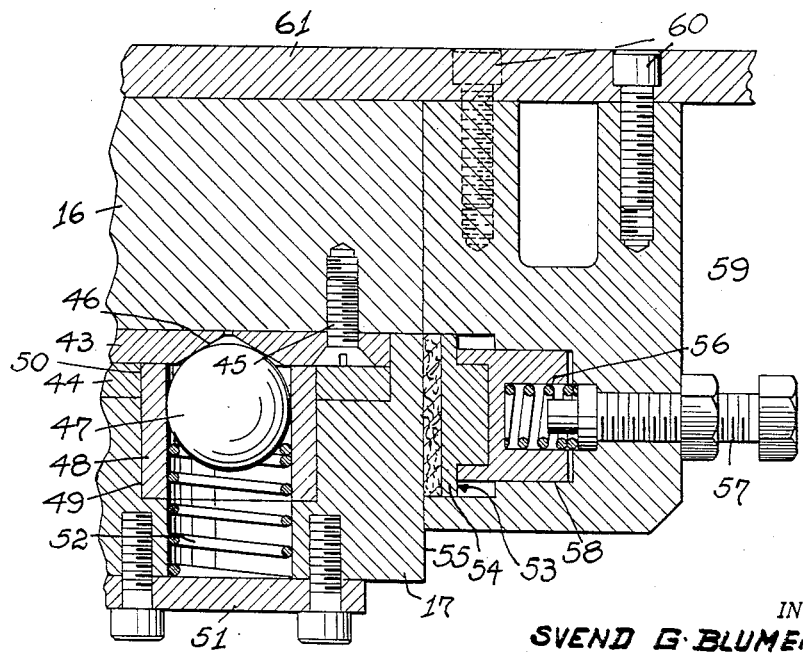
Fig. 8 is an enlarged sectional view on line 8—8 of Fig. 4.

The disk 17 (see Figs. 1a and 8) which is mounted on shaft 27 and keyed to said shaft by key members 39 is held in place by a washer 40 and a hexagonal screw 41 threaded into said shaft. Disk 17 is formed with an axial bore 42 and has its face opposite base plate 16 recessed to seat two ring-shaped steel disks 43 and 44. Steel disk 43 is attached to base plate 16 by screws 45 and includes four cone-shaped recesses 46 for spring-pressed steel balls 47. These steel balls are shiftably arranged in cylindrical bushings 48, press fitted in holes 49 of disk 17 and extended through bores 50 of steel disk 44. The holes 49 are closed by end plate 51 and located to align in predetermined positions bushings 48 with the cone-shaped recesses 46 to hold disk 17 in predetermined positions by the steel balls 47 which are forced into said recesses by compression springs 52.

The thus constructed disk 17 (see Figs. 7 and 8) is frictionally held against free rotation by a spring-pressed, friction drag shoe member 53 embodying a friction shoe 54 yieldingly forced into engagement with the peripheral surface 55 of the disk by a compression spring 56, the tension of which is adjustably controlled by a screw member 57. Spring-pressed, friction-shoe drag member 53 is slidably mounted in a bore 58 of a bracket 59 which is secured by screw members 60 to a plate 61 mounted on base plate 16, and secured together with said base plate to the ram of the punch press previously referred to.

Figure 2:
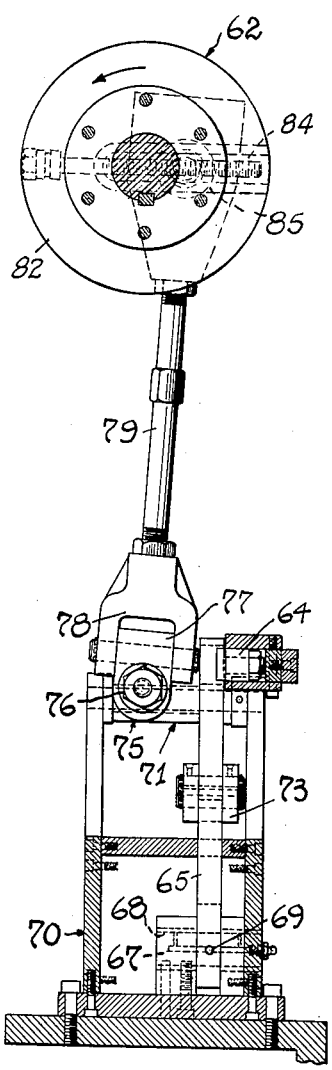
Fig. 2 is a cross-sectional view on line 2—2 of Fig. 1.

The disk 17 is intermittently rotated by the rack and pinion drive arrangement 24, the rack bar 31 of which is oscillated by a slide feed arrangement 62 (see Figs. 1 and 2) actuated by the punch press as will be described hereinafter. For such purpose rack bar 31, guided in the slot 32 of base plate 16 and a channel-like member 63 aligned with slot 32, mounts at one end a cam follower 64 which is actuated upon by a cam member 65 effecting oscillatory movements of the rack bar. Cam member 65 is provided with an L-shaped cam slot 66 for cam follower 64 and mounts at one end a shaft 67 extended through a bore 68 of said member and secured thereto by a screw 69. The shaft 67 is freely-rotatably supported in a housing 70 which supports a bell crank 71, one arm 72 of which is hinged to cam member 65 by links 73, and the other arm 74 of which is connected to the slide arrangement 62. To that effect arm 74 of bell crank 71 carries at its free end a swivel member 75 which is held in swivel connection with arm 74 by a shaft-like screw member 76, and has laterally extended therefrom perforated ear 77 hinged to the bifurcated end 78 of a longitudinally bell crank 71 with necting rod 79, connecting the bell crank 71 with crank member 80 of slide feed arrangement 62. The slide feed arrangement is attached to the rotary brake drum 81 of the punch press and embodies a housing 82 secured to said brake drum by screw members 83. This housing is formed with a key slot 84 slidably adjustably mounting crank member 80 which includes a ball-like member 85 coupled with the free end portion of connecting rod 79 to provide a universal joint connection between rod 79 and crank member 80.

Figure 3:
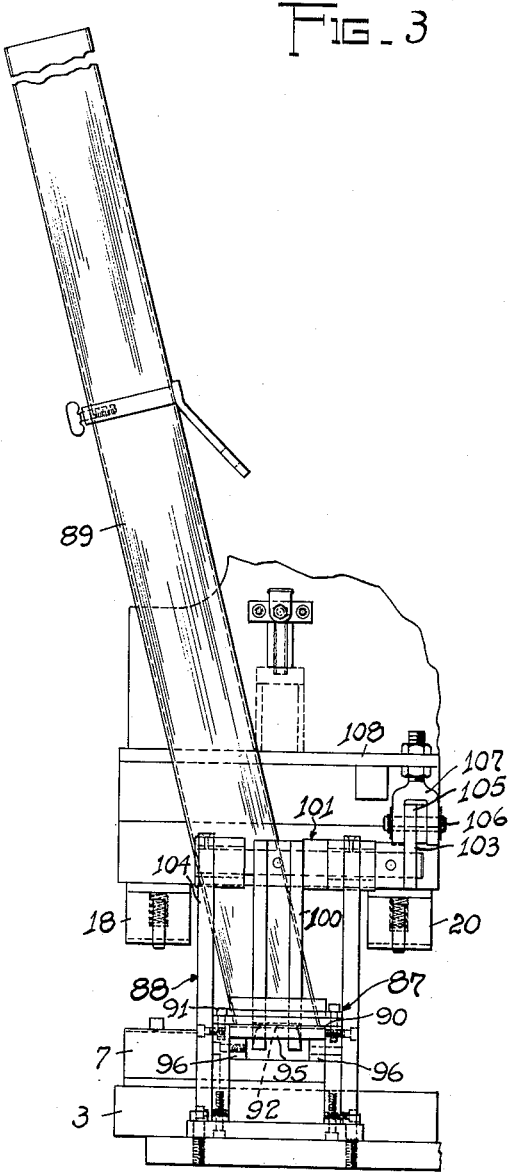
Fig. 3 is an end view of the fixture shown in Fig. 1, the view being taken from line 3—3 of said Fig. 1.
Figure 4:
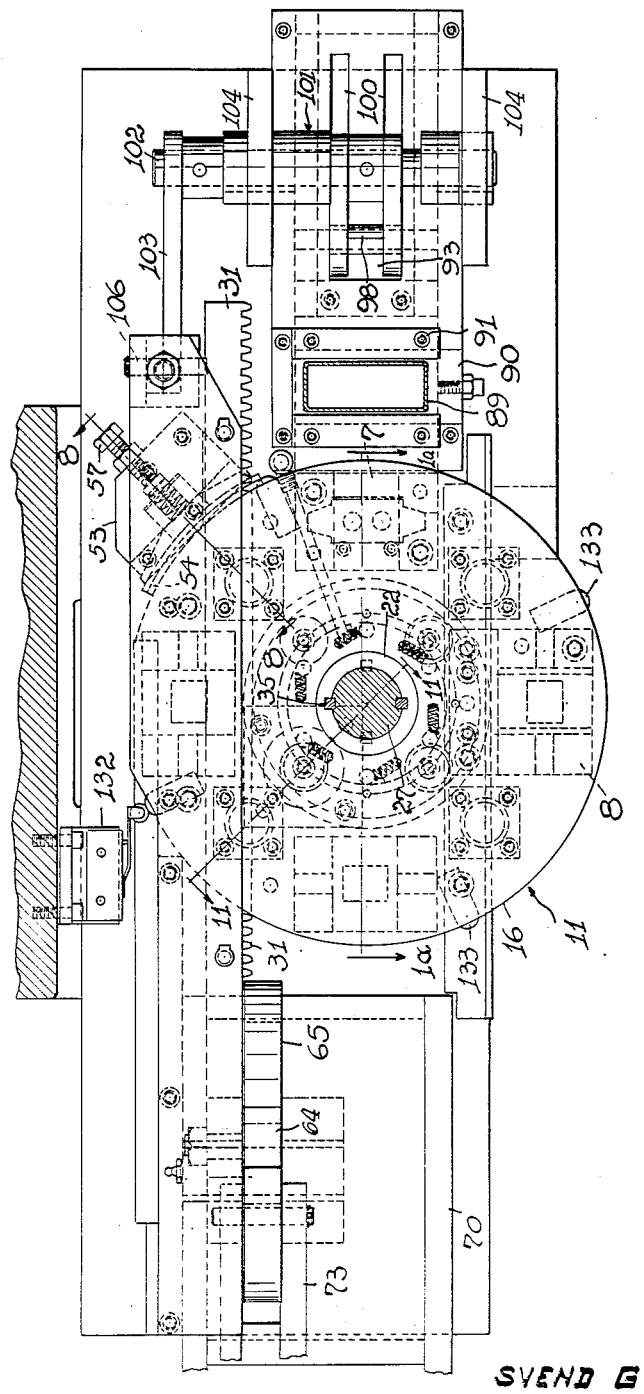
Fig. 4 is a horizontal sectional view through the fixture taken on line 4—4 of Fig. 1.
Figure 13:
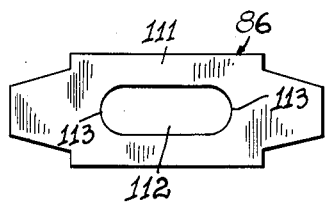
Fig. 13 is a perspective view of one of the blanks for the clips.

Clip-forming die shoe 7 is fed with blanks 86 (see Fig. 13) by a feed device 87 (see Figs. 1 and 3) mounted adjacent to the clip-forming die shoe. This device embodies a housing 88 supporting a magazine 89 for blanks 86, which magazine is open at its bottom end and attached to the top wall 90 of housing 88 by screws 91 opposite an opening in said top wall effecting open communication between the magazine 89 and a guide channel 92 extending below the top wall 90 adjacent to the top of clip-forming die shoe 7. The guide channel 92 slidably mounts a pusher plate 93 having the thickness of the die blanks to be fed to clip-forming die shoe 7, and this pusher plate is attached to front end 94 of a slide frame 95 which is slidably mounted on rails 96 attached to the wall of housing 88. The slide frame 95 includes an elongated opening 97 and supports crosswise of said opening, substantially midway thereof, a pin member 98 which is slidably engaged by the fork-shaped end 99 of the one arm 100 of a bell-crank-like member 101. Shaft 102, rigidly attached to bell crank member 101 between its arms 100 and 103, pivotally mounts this member in the upwardly extended side walls 104 of housing 88. The bell crank arm 103 slidably engages with its fork-shaped end 105 a pin 106 which is mounted in a fork-shaped bracket 107 secured to an elongated metal plate 108 arranged adjacent to plate 61.

Figure 9:
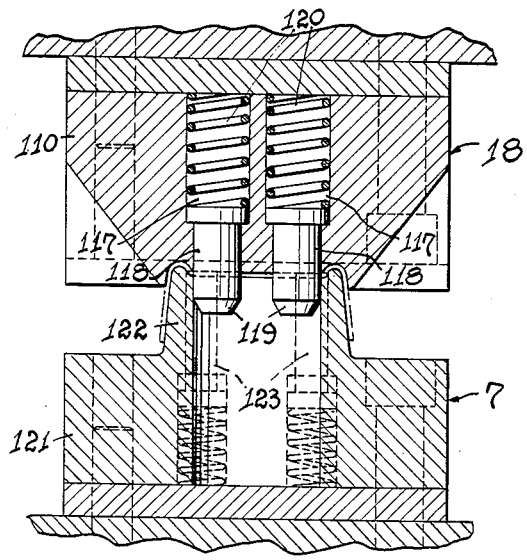
Fig. 9 is a sectional view through one of the die elements of the axially-rotatable die head cooperating with the clip-forming station of the stationary die member.
Figure 10:
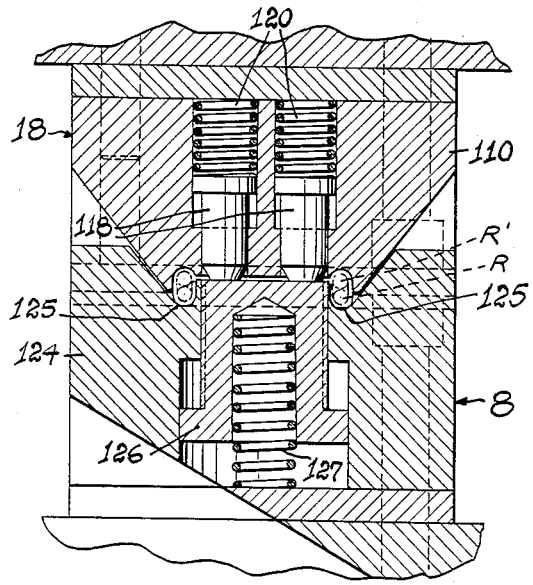
Fig. 10 is a sectional view through one of the die elements of the axially-rotatable die head cooperating with the clinching station of the stationary die member.
Figure 11:
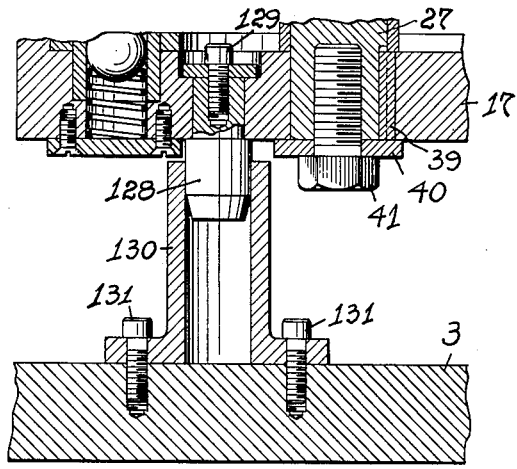
Fig. 11 is a fragmentary section on line 11—11 of Fig. 4.
Figure 12:
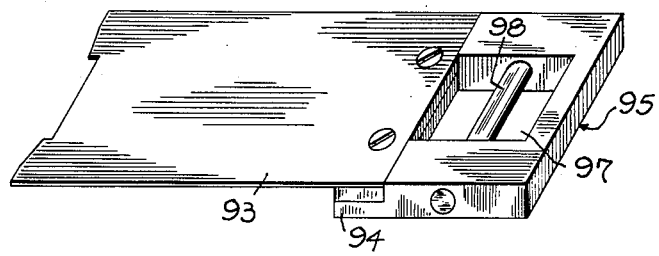
Fig. 12 is a perspective view of the slide of the feeding device.
Figure 14:
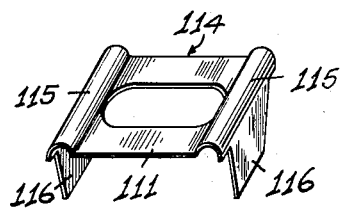
Fig. 14 is a perspective view of the preformed clip.

Clip forming and clinching operations are effected by the clip-forming die shoe 7 and clinching die shoe 8 in cooperation with each one of the die punches 18, 19, 20 and 21. These punches are attached to the bottom of the disk 17 by means of screws 109 (see Fig. 7) in such a manner that each quarter revolution of disk 17 aligns one of the punches 18, 19, 20 and 21 with forming die shoe 7 and another one of said die punches with clinching die shoe 8. The clip-forming and clinching action of each of the punches 18, 19, 20 and 21 will best be understood from Figs. 9 and 10 showing in Fig. 9 one of the punches 18, 19, 20 and 21, to wit punch 18, cooperating with forming die shoe 7, and in Fig. 10 such punch 18 after rotation with disk 17 cooperating with die shoe 8 in clinching the clip previously formed by forming die 7 around wire members to be connected. All the punches 18, 19, 20 and 21 being identical in shape and construction, description of one of the punches, to wit: punch 18 is sufficient. Punch 18 includes a die block 110 shaped to form in cooperation with the die shoe 7 a clip blank 86 (see Fig. 13) to a U-shaped clip 114 (see Fig. 14), the clip blank including a central area 111 with an enlongated cutout 112 having rounded corners 113. The U-shaped clip 114 embodies the said central area 111 and symmetrically arranged rounded recesses 115 adjacent to said central area, which recesses have flanged portions 116 integrally extended therefrom. The die block 110 (see Fig. 9) has shiftably mounted in parallelly arranged recessed bores 117 two shouldered spring pressed plunger members 118 which include cone shaped ends 119 and are yieldingly forced out of block 110 by springs 120. Plunger members 118 are dimensioned to frictionally engage the rounded corners 113 of the elongated cutout portion 112 so as to frictionally hold the formed metal clip and carry same to the die shoe 8 for clinching operations when disk 17 is rotated. The die shoe 7 includes a die block 121 having a protruding cylindrical portion 122 adapted to effect in conjunction with die block 110 shaping of the blank 86 to the U-shaped clip 114.

The die block 121 embodies two spring pressed ejector pins 123 which tend to eject the U-shaped clip 114 from die shoe 7 and facilitate lifting of a formed clip 114 from said die shoe by the plunger members 118 of the punches.

In clinching operations each punch cooperates with clinching die shoe 8 (see Fig. 10) embodying a die block 124 provided with parallelly arranged grooves 125 which seat the wire members R, R' to be connected, which wire members have been fed into the grooves either manually or automatically. Grooves 125 are spaced to extend opposite the recesses 115 of a preformed clip 114 and shaped to effect inward turning of the flanged portions 116 of such clip to encircle the said wire members to be connected. The die block 124 includes a central spring pressed plunger 126 which in clipping operations yieldingly forces the spring pressed plunger members 118 of a punch upwardly to free preformed clip 114 from said members and insure proper clinching operations. Plunger 126 is forced upwardly by a spring 127, the compression force of which is larger than the combined compression force of springs 120 actuating upon plunger members 118.

When mounted on a punch press, as described above, feed arrangement 62 effects at the beginning of each down stroke of the press one fourth revolution of disk 17, as slide feed arrangement 62 actuates—through bell crank 71, cam member 65 and cam follower 64—the rack and pinion drive arrangement 24. Rotation of disk 17 is limited to one fourth of a revolution by the L-shaped slot 66 in cam member 65 which slot provides a positive drive connection between cam member 65 and cam follower 64 only for approximately one-half of the downward stroke of the punch press and thereafter permits a lost motion between cam member 65 and cam follower 64, so that disk 17 is held at a stand-still during clip forming and clinching operations. Proper stopping of disk 17 is effected by the spring-pressed steel balls 47 in cooperation with the cone-shaped recesses 46 in steel disk 43 and the spring-pressed friction drag shoe member 53. The above referred to one-half downward stroke of the punch press simultaneously effects feeding of a clip blank 86 by actuation of bell crank member 101, effecting shifting of pusher plate 93 and therewith transfer of the lowest clip blank in magazine 89 to die shoe 8. Further downward movement of the ram of the punch press effects extension of the respective one of four guide pins 128 attached to the bottom face of disk 17 by screws 129 into a guide member 130 which is seated on the top of plate 3 and is attached thereto by screws 131, forming of the die blank on die shoe 7 by the respective one of the punches 18, 19, 20 and 21 to a U-shaped clip 114, and clinching of another previously formed U-shaped clip around the wire members R, R' manually or automatically fed into the grooves 125 of die shoe 8 by the respective one of punches 18, 19, 20 and 21. The disk 17 is not rotated by upward movement of the ram of the punch press as ratchet clutch drive 26 is activated only by left hand rotation of pinion 25. In operation the die fixture effects stopping of the punch press after each stroke by actuation of a minute switch 132 actuated by a plurality of spaced lugs 133 secured at predetermined positions to the peripheral wall of disk 17.

Having thus described my invention, what I claim is:

1. In a die fixture for successively forming clips from blanks and clinching the clips around wire members, a base, a stationary clip-forming die shoe and a stationary clip-clinching die shoe mounted on said base, an intermittently, horizontally rotatable member arranged above said die shoes in vertically shiftable arrangement with respect thereto, a plurality of identically constructed punches mounted in spaced relation on said rotatable member, and a clip pick up and supporting means mounted on each of said punches, each punch with its pick up and supporting means being arranged to successively form a clip by cooperation with the clip-forming die shoe, transfer the clip to the clip-clinching die shoe, and clinch the clip around a wire member by cooperation with the clip-clinching die shoe.

2. In a die fixture as described in claim 1, a non-rotatable, vertically shiftable supporting member rotatably mounting said horizontally rotatable member, and driving means adapted to intermittently rotate said horizontally rotatable member, said driving means including a driven reciprocatory element mounted on said supporting member and a one-way clutch member coupling said driven element with the said horizontally rotatable member, said one-way clutch member adapted to effect in cooperation with said driven reciprocatory element a one-way step by step rotation of the horizontally rotatable member when the driven reciprocatory element of the driving means is reciprocated.

3. In a die fixture as described in claim 1, a non-rotatable, vertically shiftable supporting member rotatably mounting the horizontally rotatable member, driving means on the base and the said supporting member including a reciprocally driven element, a rotary element engaged with said latter element and a one-way clutch member coupling the rotary element with the horizontally rotatable member, said driving means, when actuated, adapted to effect a one-way step by step relation of the horizontally rotatable member, a stationary blank feeding device arranged adjacent to the clip-forming die shoe, said blank feeding device including reciprocatory blank feeding means, and actuating lever means coupling said feeding means with said vertically shiftable supporting member to effect timed actuation of the blank feeding device when the vertically shiftable supporting member is shifted in opposite directions.

References Cited in the file of this patent

UNITED STATES PATENTS

| Number | Name | Date |
|---|---|---|
| 922,392 | Christianson | May 18, 1909 |
| 1,152,055 | Schellenbach | Aug. 31, 1915 |
| 1,629,694 | Ford | May 24, 1927 |
| 1,636,167 | Bozsin | July 19, 1927 |
| 2,267,015 | Church | Dec. 23, 1941 |
| 2,282,959 | Gibbs | May 12, 1942 |
| 2,340,448 | Andren | Feb. 1, 1944 |
| 2,348,464 | Geertsema | May 9, 1944 |
| 2,359,420 | Herzog | Oct. 3, 1944 |
| 2,367,015 | Finzel | Jan. 9, 1945 |
| 2,409,147 | Neuhaus et al. | Oct. 8, 1946 |
| 2,493,933 | Thompson | Jan. 10, 1950 |
| 2,547,616 | Beekman | Apr. 3, 1951 |